Dec. 20, 1960     J. A. DELAP ET AL     2,965,585
PREPARATION OF POROUS POLYMER STRUCTURES
Filed Jan. 20, 1958
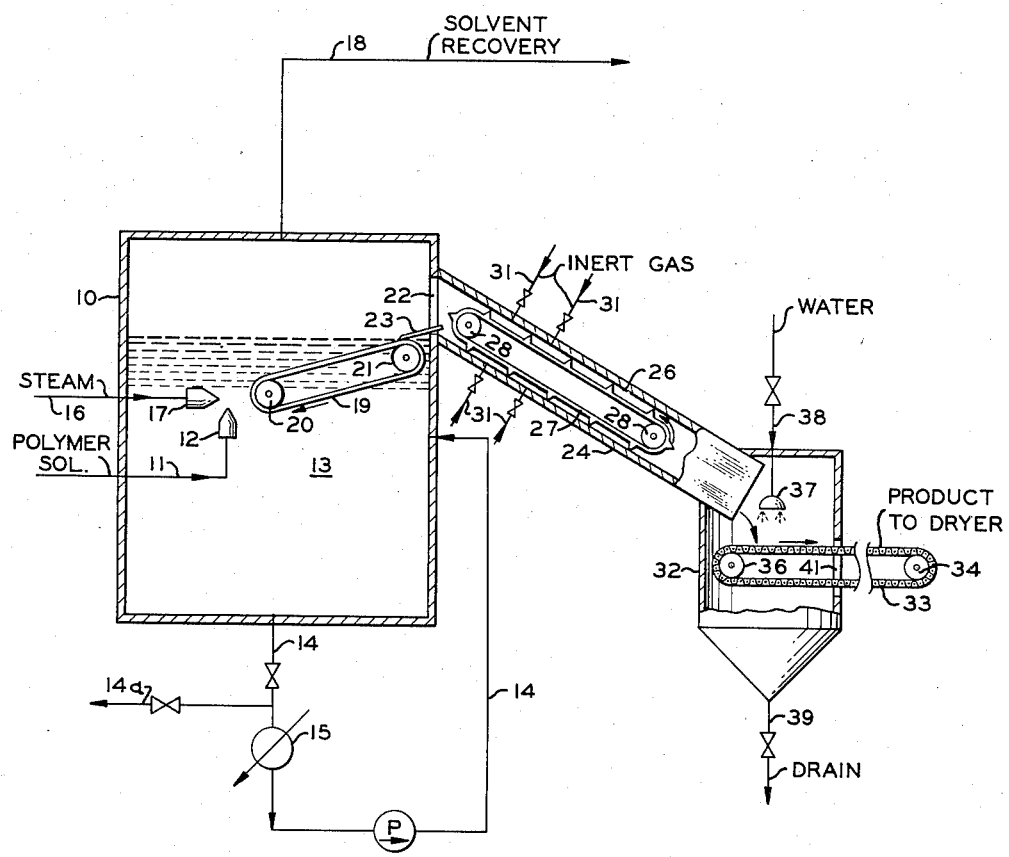
INVENTORS
J. A. DELAP
R. E. DIETZ
BY *Hudson & Young*
ATTORNEYS

United States Patent Office 2,965,585
Patented Dec. 20, 1960

2,965,585

PREPARATION OF POROUS POLYMER STRUCTURES

Joseph A. Delap and Richard E. Dietz, Bartlesville, Okla., assignors to Phillips Petroleum Company, a corporation of Delaware Filed Jan. 20, 1958, Ser. No. 709,814

9 Claims. (Cl. 260—2.5)

This invention relates to porous structures formed from rubbery polymers. In one aspect, it relates to a method for forming porous structures from rubbery polymers.

In recent years, considerable interest has been shown in the production of synthetic polymers and in the various uses for the materials so produced. The polymerizations are sometimes carried out so as to provide a product having a cellular or porous structure. It has also been found that a product having such a structure can be produced by utilizing a suitable blowing agent. These products have many applications among which may be mentioned their use as substitutes for cork or sponge rubber.

It is an object of this invention to provide a novel cellular or porous structure of a rubbery polymeric material.

Another object of the invention is to provide a process for producing a porous structure of a rubbery polymer.

Other and further objects and advantages of the invention will be apparent to those skilled in the art upon consideration of the accompanying disclosure.

The instant invention resides in a novel porous structure of a rubbery polymer and in a method for producing such structures. Broadly speaking, the method comprises injecting a stream of a solution of a rubbery polymer in a solvent into a liquid material, which is a nonsolvent for the polymer, the temperature of the liquid material being above the softening point of the rubbery polymer and the temperature of the stream of polymer solution upon injection being in the range of a temperature about 20° F. below to a temperature about 50° F. above that of the liquid material, injecting a stream of hot gas into the liquid material so that the two streams impinge, and recovering a resulting porous structure of a rubbery polymer. The porous structure formed in accordance with this process can be conveniently collected in the form of a continuous band or blanket which can be cut into sections of any desired length. The products are useful as floor coverings, carpet pads, insulation, and wall and ceiling tile having good sound absorbing properties.

The polymeric materials used in the preparation of the porous structures are solid rubbery polymers. The solid rubbery polymers are preferably obtained by the polymerization of conjugated dienes, preferably containing from 4 to 6, inclusive, carbon atoms per molecule, either alone or in admixture with one another or with lesser amounts of one or more other compounds containing an active $CH_2=C<$ group. When preparing copolymers with the latter compounds, it is preferred to employ not more than 30 parts by weight of such latter compounds per 100 parts by weight of total monomers. Examples of rubbery polymers which are applicable include polybutadiene, polyisoprene, polypentadiene, polymethylpentadiene, and butadiene-styrene, butadiene-isoprene, butadiene-methylacrylate, butadiene-ethylacrylate, and isoprene-styrene copolymers. These polymers can be produced by well-known polymerization methods, such as mass polymerization and emulsion polymerization. It is preferred to obtain the rubbery polymers by emulsion polymerization, and it has been found that polymers of 1,3-butadiene prepared at 41° F. and having a Mooney viscosity below 40 (ML–4) measured at 212° F. are particularly useful in preparing the novel porous structures of this invention.

It has also been discovered that the above-described rubbery polymers can be advantageously hydrogenated prior to their use in the process of this invention. The hydrogenation is carried out in the presence of a hydrogenation catalyst such as nickel-kieselguhr, Raney nickel, copper chromite, molybdenum sulfide, finely divided platinum, finely divided palladium, platinum oxide, copper chromium oxide, and the like. It is generally preferred to employ a nickel-kieselguhr catalyst having a reduced nickel content of from 30 to 80 weight percent. The polymer is charged to a hydrogenation reactor in the form of a solution or dispersion in a suitable solvent, the catalyst is added, and hydrogen is introduced until the desired pressure is reached. The amount of catalyst employed in the hydrogenation is preferably in the range from 1 to 100 weight percent of the polymer. With highly active hydrogenation catalysts, such as nickel supported on kieselguhr, 2 to 20 weight percent of catalyst gives a desirable rate of hydrogenation. The solvent or dispersion medium used in the hydrogenation is one which is preferably inert to hydrogenation, such as saturated cyclic hydrocarbons, including cyclopentane, methylcyclopentane, cyclohexane, methylcyclohexane, and the like. Mixtures of these solvents can also be used. Furthermore, it is not necessary to employ the pure cycloparaffins, the commercial grades being satisfactory. Other solvents which can be used include mixtures of naphthenes and paraffins. The hydrogenation is preferably carried out at a pressure in the range of atmospheric to 3000 p.s.i.g., the usual range being between 100 and 1000 p.s.i.g. The temperature can vary from 75° F. up to the degradation temperature of the polymer or the critical temperature of the solvent, the maximum temperatures reaching as high as 575° F. The preferred temperature range is from 300 to 525° F. The unsaturation of the polymer is generally reduced to a value of about 0 to 50 percent, based upon the theoretical value of 100 percent for the unhydrogenated polymer. Preferably the hydrogenation is continued until the residual unsaturation is less than 30 percent. Upon completion of the hydrogenation, the catalyst is removed by filtering, centrifuging, or other suitable methods. The hydrogenated polymer is generally recovered by drum drying or by stripping the solvent in vacuo. However, as indicated hereinafter, the hydrogenated rubbery polymer in solution in the solvent used in its preparation can be employed directly in the process of this invention after removal of the hydrogenation catalyst.

A better understanding of the invention can be obtained by referring to the drawing which is a diagrammatic illustration of an arrangement of apparatus and a flow diagram according to the invention.

The apparatus of the drawing, which is shown partly in section, comprises an enclosed container or chamber 10. A solution of a rubbery polymer in a solvent is pumped from a source not shown in the drawing through line 11, a portion of which is positioned within container 10. Attached to the end of line 11 disposed in the container is an orifice 12 which is immersed in a liquid material 13. The polymer solution is formed by dissolving the rubbery polymer in any suitable inert solvent. It is preferred to utilize hydrocarbon solvents such as paraffins, cycloparaffins, and/or aromatic hydrocarbons. Examples of such solvents include hexane, heptane, octane, isoheptane, isooctane, cyclohexane, methylcyclohexane, benzene, toluene, and the like. While it is usually desired to use hydrocarbon solvents, it is within the scope of the invention to employ other types of solvents such as halogenated paraffins and aromatics, e.g., carbon tetrachloride, chlorobenzene, and the like. The solvent utilized preferably has a boiling point below about 300° F., more desirably below about 210° F. It is to be understood that mixtures of the aforementioned solvents can be used in the practice of this invention. When using hydrogenated rubbery polymers in the process of this invention, the solution of hydrogenated polymer recovered from the hydrogenation process can be passed directly into container 10 through line 11 after removal of catalyst particles from the solution.

While the concentration of the polymer in the solution can be varied over moderate limits, it is usually preferred to employ only dilute solutions of the polymer. Solutions containing from 1 to 10 weight percent polymer are generally employed because at higher concentrations of polymer the solutions are sometimes too viscous for satisfactory use in the process. It is preferred to use solutions containing from 2 to 6 weight percent of the polymer. It is also within the purview of the invention to add small amounts of anioxidants, pigments, plasticizers, stabilizers, and the like, to the polymer solution in order to achieve certain desired effects.

As mentioned hereinbefore, the polymer solution is injected into container 10 below the surface of a liquid material 13 contained therein. Although any suitable liquid material which is a non-solvent for the polymer and which preferably has a very low solubility in the solvent used to dissolve the polymer can be employed, it is usually preferred to employ water as the bath into which the polymer solution is injected. Examples of other liquid materials which can be used are alcohols, glycols, amines, ethers and ketones. Specific examples of these materials include isopropyl alcohol, neopentyl glycol, triethylamine, tri-n-propyl amine, ethyl propyl ether, di-n-propyl ether, acetone, and the like. The water or other liquid material may have dissolved or dispersed therein certain reagents to improve the product. For example, the water may contain a dye which will color the porous structure, an alkali to neutralize any acidic groups, or a soap, such as sodium stearate, to provide a coating and improve the feel of the polymer.

In order to produce the porous structures of this invention, it is important that the temperature of the bath be closely controlled. Thus, while the temperature of the bath is below its boiling point, it must be at least 10° F. above the softening point of the rubbery polymer. In the case of hydrogenated polybutadiene, the softening point is usually in the approximate range of 165 to 185° F., although it will vary with the molecular weight of the polymer and the degree of hydrogenation. The softening point of any polymer can be readily determined by the method described by Karrer, Davies, and Dietrich, Industrial & Engineering Chemistry, Analytical Edition, 2, 96–99 (1930). By this method, a softness curve is obtained by plotting softness values against temperature, and the softening point is taken as the temperature at which the tangent to the softening curve is 60°. When using a water bath, the bath temperature is usually in the range of 195 to 210° F. However, depending upon the softening point of the particular polymer, higher and lower temperatures can be used. The bath temperature is controlled by pumping liquid material recovered via line 14 from the bottom of container 10 through indirect heat exchanger 15 and then recycling the material to the container. Line 14a provides means for removing liquid material from the system and thereby maintain a desired liquid level in container 10. Although not usually required when using steam as the hot gas and a water bath, a line may also be provided for adding make-up liquid material to container 10.

The temperature of the polymer solution as it leaves orifice 12 is preferably not more than 10° F. either side of the temperature of the bath, more desirably approximately equal to the bath temperature. In any event, the polymer solution should not be less than about 20° F. below nor more than about 50° F. above the bath temperature. The temperature of the polymer solution and the bath can be equalized by adjusting the length of line 11 which is disposed in the bath. In some instances, it is found to be advantageous to employ a coil immersed in the bath through which the polymer solution circulates prior to being injected into the liquid material through orifice 12.

Line 16 provided with an orifice 17 furnishes means for injecting a hot gas into liquid material 13. Any suitable inert gas, e.g., nitrogen, can be used; however, it is preferred to utilize steam as the hot gas. It is noted that the orifices 12 and 17 are so positioned that the jets of polymer solution and steam impinge upon being injected into the bath. It is usually preferred that the streams meet at about right angles although they may intersect at lesser and greater angles without departing from the scope of the invention. It is noted also that steam orifice 17 is located above orifice 12 through which the polymer solution is injected. Although it is not intended to limit the invention to any particular dimensions, it has been found that good results are obtained when using orifices positioned about 0.25 inch apart and having inside diameters in the range of 0.01 to 0.20 inch. The temperature of the hot gas is such that it is above the boiling point of the solvent in which the polymer is dissolved. By controlling the volume of steam injected through orifice 17, it is thereby possible to rapidly evaporate the solvent contained in the polymer solution. Steam pressures in the range of 20 to 200 p.s.i.g. corresponding to steam temperatures of about 259 to 388° F. are usually preferred. This evaporation of the solvent can also be assisted by using a solvent having a boiling point below the temperature of the water bath. However, it is to be understood that solvents having a boiling point above that of the water or other liquid material can be utilized. In such a case, the solvent which collects as a separate layer can be readily removed by a syphon or other suitable means. When the solvent collects on the surface of the liquid material, it is desirable to prevent contact between the solvent and the porous structure, e.g., by positioning a screen below the interface of the solvent and liquid material. The solvent which is evaporated as a result of the impingement of the steam and polymer solution streams is removed from container 10 through line 18. The recovered solvent can thereafter be utilized in the formation of the polymer solution.

As a result of the impingement of the polymer solution and steam streams in the water bath and the evaporation of the solvent, the polymer solidifies in the form of a porous structure. The porous structure so formed is advantageously removed from container 10 in the form of a continuous band or blanket. This removal is accomplished by employing a conveyor comprising a continuous belt 19 which revolves in a clockwise direction on drums 20 and 21. The porous structure on formation tends to rise to the surface of liquid material 13 and in rising contacts belt 19. On contacting belt 19 of the conveyor, the porous structure is moved toward opening 22 provided in the side of container 10 above the surface of the bath. A doctor blade 23 attached to the wall of container 10 and maintained in contact with belt 19 provides means for stripping the band of porous structure from belt 19 and guiding same through opening 22. The end of the upper portion of belt 19 away from opening 22 is preferably located below the surface of liquid material 13, this distance and the rate of movement of the drum being determinative of the thickness of the porous structure. The end of the upper portion of belt 19 adjacent opening 22 is preferably located near the surface of the bath with the result that the conveyor is disposed at an angle as shown.

The porous structure on leaving container 10 through opening 22 enters downwardly extending chute 24. Chute 24 is desirably provided with a means for cutting the band of porous structure into sections of a desired length. The cutting means as illustrated comprises a plurality of cutting edges or knives 26 which are rigidly attached at right angles to an endless belt or chain 27. Chain or belt 27 and its attached cutting edges are continuously moved in a counterclockwise direction by means of a pair of drums or sprockets 28. As one of the cutting edges initially comes into contact with the porous structure, it cuts off a length of the porous structure equal to the distance between successive cutting edges. Sections of the porous structure of any desired length can be readily obtained by adjusting the distance between the cutting edges carried by revolving belt or chain 27. Lines 31 provide means for injecting an inert gas, such as nitrogen, into the spaces between the cutting edges and the sides of chute 24. The inert gas so introduced is at such a pressure that it passes through chute 24 into container 10. Although higher and lower pressure can be used, it is usually perferred to maintain a pressure of about atmospheric in container 10. By passing an inert gas into chute 24 through lines 31, solvent evaporated from bath 13 is prevented from leaving container 10 through chute 24 and necessarily passes through line 18.

The sections of porous structure, which are moved downwardly through chute 24 by the cutting edges, then enter vessel 32. On leaving chute 24, the sections fall on a conveyor comprising a porous belt 33 which rotates on drums 34 and 36. Positioned above porous belt 33 is a spray nozzle 37 connected to a water line 38. The sections of porous structure are washed by means of water injected through spray nozzle 37, the water draining from these sections through the porous belt into the bottom of vessel 32. Line 39 connected to the bottom of vessel 32 provides means for draining water from the vessel. After being washed with water, the sections of porous structure are removed from vessel 32 by means of revolving belt 33 which etxends through an opening 41 in the side of the vessel. Thereafter, the sections are passed to a drier wherein they are dried prior to being placed in storage or otherwise treated to form articles of commerce.

A more comprehensive understanding of the invention can be obtained by referring to the following illustrative examples which are not intended, however, to be unduly limitative of the invention.

*Example I*

A polymer of 1,3-butadiene was prepared which had a Mooney (ML-4) value of 20. This polymer was hyrogenated in methylcyclohexane in the presence of a reduced nickel-kieselguhr catalyst. After completion of the hydrogenation, the catalyst was removed from solution by filtration. The resulting solution contained about 4 percent of the hydrogenated polymer and had a density of about 6 pounds per gallon. The polymer was found to contain about 18 percent residual unsaturation and had a softening point of about 175° F.

A cylindrical tank, 20 inches in diameter and 40 inches high, was equipped with two inlet lines, one for steam and the other for polymer solution, as shown in the drawing. The steam orifice had an 0.0994 inch I.D. while the polymer solution orifice had an 0.05 inch I.D. The two orifices were approximately 0.13 inch apart and were located about 6 inches below the surface of the water bath. About 14 inches of the polymer solution inlet line was located within the cylindrical tank. The tank was also equipped with a 10-inch stirrer which was operated at 350 r.p.m.

About 30 gallons of water and 8 grams of sodium stearate were charged to the tank and heated with steam supplied through the steam inlet line. The water bath was maintained at a temperature between 196 and 200° F. during the course of the run. The steam pressure, as measured upstream from the steam orifice, was in the range of 50 to 75 p.s.i.g. During a 1.5 hour period, 8 gallons of the above-described 4 percent polymer solution was pumped into the tank at a constant rate through the lower orifice. The polymer solution on leaving the orifice was at a temperature approximately equal to that of the bath temperature. The spongy product which was formed floated on the surface of the water and was recovered and dried. The product had an apparent density of 0.32 g./cc. as compared to the polymer density of 0.92 g./cc. The void space in the porous product was, therefore, about 65 percent by volume.

*Example II*

Another run was made utilizing the apparatus described in Example I. In this run, a 4 percent solution of hydrogenated polybutadiene (8.7 percent unsaturation) in methylcyclohexane was pumped through the lower orifice at a rate of 7 gallons per hour. The hydrogenated polybutadiene had a softening point of about 175° F. As in Example I, the steam pressure was in the range of 50 to 75 p.s.i.g. The temperature of the bath was 132° F., and a vacuum of 23 inches of mercury was maintained on the system to facilitate removal of the solvent at this temperature. The temperature of the polymer solution on leaving the orifice was about equal to that of the bath temperature. No soap or other additive was added to the tank. The tank was agitated with the 10-inch stirrer which was run at 350 r.p.m. The product obtained was a low density crumb having a particle size of about ⅛ to ⅜ inch.

Example II illustrates the importance of operating so that the bath temperature is at least 10° F. above the softening point of the polymer. Thus, when the temperature of the bath was below the softening point of the polymer, i.e., below about 175° F., the product obtained was a low density crumb. This type of product is to be compared with that obtained in Example I, which had a porous or cellular structure.

It will be apparent to those skilled in the art that various modifications and variations of the invention can be made upon study of the foregoing disclosure. For example, while the apparatus disclosed for carrying out the instant process has been described as comprising a single pair of orifices, it is within the scope of the invention to employ a plurality of pairs of orifices arranged in parallel. Such modifications and variations are believed to be clearly within the scope of the invention.

We claim:

1. A method for forming porous structures of rubbery polymers which comprises injecting a stream of a solution of a rubbery polymer in an inert hydrocarbon solvent having a boiling point below about 300° F. into water below its surface, said polymer being selected from the group consisting of a homopolymer of a conjugated diene, a copolymer of a conjugated diene and a compound containing an active $CH_2=C<$ group copolymerizable therewith, a hydrogenated homopolymer of a conjugated diene, and a hydrogenated copolymer of a conjugated diene and a compound containing an active $CH_2=C<$ group, copolymerizable therewith, the temperature of said water being at least 10° F. above the softening point of said rubbery polymer and the temperature of said polymer solution upon injection being in the range of a temperature about 20° F. below to a temperature about 50° F. above that of said water; injecting a stream of steam having a temperature above the boiling point of said solvent into said water so that said streams impinge, the quantity and temperature of said stream of steam being sufficient to vaporize said solvent; and recovering a resulting porous structure of said rubbery polymer.

2. The method according to claim 1 in which said rubbery polymer is a polymer of 1,3-butadiene.

3. The method according to claim 1 in which said rubbery polymer is a polymer of isoprene.

4. The method according to claim 1 in which said rubbery polymer is a copolymer of 1,3-butadiene and styrene.

5. The method according to claim 1 in which said rubbery polymer is a hydrogenated polymer of 1,3-butadiene.

6. The method according to claim 1 in which said rubbery polymer is a hydrogenated polymer of isoprene.

7. A method for forming porous structures of rubbery polymers which comprises injecting a substantially vertical stream of a solution containing from 1 to 10 weight percent of a rubbery polymer in an inert hydrocarbon solvent having a boiling point below the temperature of the hereinafter mentioned water into and below the surface of a body of water contained in an enclosed contact zone so that said stream is directed toward the surface of said water, said polymer being selected from the group consisting of a homopolymer of a conjugated diene, a copolymer of a conjugated diene and a compound containing an active $CH_2=C<$ group copolymerizable therewith, a hydrogenated homopolymer of a conjugated diene, and a hydrogenated copolymer of a conjugated diene and a compound containing an active $CH_2=C<$ group copolymerizable therewith, the temperature of said water being at least 10° F. above the softening point of said rubbery polymer and the temperature of said polymer solution upon injection being in the range of a temperature about 10° F. below to a temperature about 10° F. above that of said water; injecting a substantially horizontal stream of steam into said body of water so that said streams impinge, the quantity and the temperature of the steam so injected being sufficient to vaporize said solvent; withdrawing vaporized solvent from said chamber; and recovering a resulting porous structure of said rubbery polymer from the surface of said body of water.

8. The method according to claim 7 in which water is removed from a lower portion of said chamber and then recycled to said chamber, said water prior to return to said chamber being passed in indirect heat exchange with a coolant.

9. A method for forming porous structures of rubbery polymers which comprises injecting a stream of a solution containing from 1 to 10 weight percent of a rubbery polymer in an inert solvent having a boiling point below about 300° F. into a liquid material below its surface, said liquid material being a non-solvent for said polymer and being selected from the group consisting of water, alcohols, amines, ethers and ketones, and said polymer being selected from the group consisting of a homopolymer of a conjugated diene, a copolymer of a conjugated diene and a compound containing an active $CH_2=C<$ group copolymerizable therewith, a hydrogenated homopolymer of a conjugated diene, and a hydrogenated copolymer of a conjugated diene and a compound containing an active $CH_2=C<$ group copolymerizable therewith, the temperature of said liquid material being at least 10° F. above the softening point of said rubbery polymer and the temperature of said stream of polymer solution upon injection being in the range of a temperature about 20° F. below to about a temperature about 50° F. above that of said liquid material; injecting a stream of hot gas having a temperature above the boiling point of said solvent into said liquid material so that said streams impinge, the quantity and temperature of said stream of hot gas being sufficient to vaporize said solvent; and recovering a resulting porous structure of said rubbery polymer.

References Cited in the file of this patent
UNITED STATES PATENTS

| | | |
|---|---|---|
| 2,057,442 | Mik | Oct. 13, 1936 |
| 2,085,052 | Taylor | June 29, 1937 |